United States Patent [19]
Glausch et al.

[11] Patent Number: 5,536,770
[45] Date of Patent: Jul. 16, 1996

[54] CONDUCTIVE COATING FORMULATION

[75] Inventors: Ralf Glausch, Darmstadt; Wolfgang Maus, Ober-Ramstadt; Norbert Stenzel, Lampertheim, all of Germany

[73] Assignee: Merck Patent Gesellschaft Mit Beschrankter Haftung, Darmstadt, Germany

[21] Appl. No.: 322,474

[22] Filed: Oct. 14, 1994

[30] Foreign Application Priority Data

Oct. 16, 1993 [DE] Germany .......................... 43 35 364.9

[51] Int. Cl.$^6$ .............................. C08K 3/10; C08K 3/34; H01B 1/06
[52] U.S. Cl. ..................... 524/410; 524/430; 524/447; 524/449; 524/451; 524/527; 252/511; 252/518
[58] Field of Search .................... 252/511, 518, 252/500; 524/430, 567, 501, 401, 410, 447, 449, 451, 527; 523/200

[56] References Cited

U.S. PATENT DOCUMENTS

| | | | |
|---|---|---|---|
| 4,469,624 | 9/1984 | Ueda et al. | 252/511 |
| 5,037,581 | 8/1991 | Saitoh et al. | 252/500 |
| 5,320,781 | 6/1994 | Stahlecker et al. | 252/518 |

FOREIGN PATENT DOCUMENTS

| | | |
|---|---|---|
| 487366 | 5/1992 | European Pat. Off. |
| 554546 | 12/1992 | European Pat. Off. |
| 0034626 | 4/1975 | Japan . |
| 0205441 | 12/1982 | Japan . |
| 1235471 | 10/1986 | Japan . |
| 3295667 | 12/1988 | Japan . |
| 1217054 | 8/1989 | Japan . |
| 2186604 | 7/1990 | Japan . |

OTHER PUBLICATIONS

SCHRIFTENREIHE PIGMENTE, Nummer 65, pp. 8–15.
English translation of claims of EP 487,366.
"Basic Characteristis and Applications of Colour Blacks"; Dr W. Schumacher.

*Primary Examiner*—Tae Yoon
*Attorney, Agent, or Firm*—Millen, White, Zelano & Branigan

[57] ABSTRACT

A conductive coating formulation comprising
(i) from 5–25% by weight of a binder comprising a mixture of
   a) from 40 to 60% by weight of an acrylic resin, and
   b) from 60 to 40% by weight of modified PVC,
(ii) from 60–85% by weight of a solvent mixture comprising ester, aromatic and ketone solvents in a ratio of from 0.9:2.5:1.2 to 1.1:2.7:1.4, and
(iii) from 5–25% by weight of an electrically conducting pigment.

16 Claims, No Drawings

CONDUCTIVE COATING FORMULATION

The invention relates to a conductive coating formulation for preventing electrostatic charging of plastics surfaces, especially PVC surfaces.

BACKGROUND OF THE INVENTION

Conventional plastics possess a surface resistance which is greater than 1000 Mohm. In order to prevent the accumulation of static electricity on plastics components, either they are finished with a conductive coating or conductive materials are incorporated into the plastic. The conductive coatings consist of a coating binder and a conductive pigment, for example carbon black or graphite. To achieve adequate conductivity, carbon black concentrations of from 10 to 30% must be used (company document from Degussa: in the Pigments series, Degussa-Pigmentruβe for leitfähige Beschichtungen [Degussa pigment blacks for conductive coatings], Number 65, pages 8 to 15).

However, because of its high light absorption in the visible region of the spectrum, carbon black cannot be employed for transparent, light coatings. A further problem is the strong absorption of carbon black in the IR region, which leads, for example when solar radiation is incident, to the coated articles undergoing heating which is in many cases unwanted. Therefore, for light, conductive coatings, antimony-doped tin oxide is increasingly employed.

EP 487,366 describes antistatic and radio-transparent coatings for antennae of space satellites. The pigment used for this purpose consists of tin dioxide and titanium dioxide, which are doped with antimony. As an option it is possible to add to the coating composition a non-conducting, white pigment, for example $TiO_2$, to improve the whiteness of the coating composition. Values of between 2 and 500 MΩ are given for the surface resistance of the coating. For antistatic coatings, for which in general a surface resistance of less than MΩ is required, the conductivity of this coating is too low.

When coating flexible PVC, additional problems arise in relation to the adhesion of the coating. The plasticizer contained in the plastic diffuses in the direction of the phase boundary between the PVC and the coating and destroys the adhesion of the coating to the plastics surface.

SUMMARY OF THE INVENTION

An object of this invention is to provide a conductive coating formulation which possesses, in addition to a high conductivity, a high transparency and a good adhesion to plastics surfaces, especially to flexible PVC.

This object is achieved according to the invention by a conductive coating formulation comprising
  (i) from 10–25% by weight of a binder (solids content) comprising a mixture of
    a) from 40 to 60% by weight of an acrylic resin, and
    b) from 60 to 40% by weight of modified PVC, particularly modified by vinyl acetate,
  (ii) from 60–85% by weight of a solvent mixture comprising esters, aromatics and ketones in a weight ratio of from 0.9:2.5:1.2 to 1.1: 2.7:1.4, and
  (iii) from 5–25% by weight of an electrically conducting pigment.

The invention further relates to the use of the coating formulation according to the invention for providing electrically conducting coatings on plastics.

Upon further study of the specification and appended claims further objects and advantages of this invention will become apparent to those skilled in the art.

The coating binder (i) employed is a mixture of from 40 to 60% by weight of an acrylic resin and from 60 to 40% by weight of a modified polyvinyl chloride.

Suitable acrylic resins are resins based on methyl methacrylate, for example.

The polyvinyl chloride can be modified with, for example, vinyl acetate.

A particularly suitable binder is a mixture of polyvinyl chloride and an acrylic resin from Röhm, Darmstadt, which is commercially available under the tradename PLEXIGUM® M 335. This product comprises a mixture of polyvinyl chloride which is modified with vinyl acetate, and an acrylic resin based on methyl methacrylate, in a weight ratio of 1:1.

The proportion of the coating binder (solids content) in the coating formulation according to the invention is from 5 to 25% by weight, preferably from 10 to 15% by weight.

For the solvent mixture (ii), esters, aromatics and ketones can be used. Esters, aromatics and ketones conventionally known as solvents may be used. It should be noted here that these three components must be mixed in a certain ratio to one another. The ester: aromatics : ketones weight ratio is from 0.9:2.5:1.2 to 1.1:2.7: 1.4.

Examples of the esters which can be employed are, for example, n-butyl acetate (90–100%) or n-butyl acetate (85%), the aromatics which can be employed are xylene, Solvesso 150 or Shellsol A. Examples of the ketones which can be employed are cylcohexanone, diacetone alcohol or diisobutyl ketone.

The electrically conductive pigments which are employed for the coating formulation according to the invention may be pigments in which the conductive system, for example antimony-doped tin oxide, is the sole constituent of the pigment. It is also possible to use pigments comprising a support with the conductive system deposited on it. One such pigment is MINATEC® 31 CM, a mica which is coated with tin oxide and antimony oxide and is produced by E. MERCK, Darmstadt. However, carbon black, and other conductive pigments of dark color, are not useful for preparing the transparent, light coatings.

Further suitable support materials, in addition to mica, are other phyllosilicates, such as for example kaolin or talc, and glass platelets. Suitable conductive systems are, for example, antimony-doped tin oxide, halogen-doped tin oxide, aluminum-doped zinc oxide or halogen-doped zinc oxide.

A further group of conductive pigments suitable for the coating formulation according to the invention are pigments based on a support material which is coated with one or more metal oxides, and in which the conductive layer is configured as the top layer. One such pigment is MINATEC® CM 30, which comprises mica coated with titanium dioxide and which has, as the conductive layer, a layer of tin dioxide doped with antimony, with a layer of silicon dioxide being additionally arranged between the metal oxide layer and the conductive layer.

The conductive pigments can be prepared by the processes described in German Patent Applications DE 38 42 330, DE 42 13 747, DE 42 40 115 and DE 42 43 163, the disclosures of which are incorporated herein by reference.

The coating formulation according to the invention is prepared by initially producing the solvents and homogenizing them. The binder is then added to the solvent mixture with stirring and dissolved. About 4 hours are necessary for this, then the pigment is added to the binder solution with stirring, and the mixture is homogenized. However, it is also possible, in order to achieve better wetting of the pigment prior to its addition, to convert it into a paste or slurry with a part of the solvent mixture before addition to the binder mixture.

This process has the advantage that the coating formulation can be prepared in a cold solution, in other words without heating.

The coatings may be applied to surfaces, particularly plastic surfaces such as PVC, by conventional means, such as, for example, by spray coating.

The Examples below are intended to illustrate the invention without representing a limitation.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application No. P 43 35 364.9, filed Oct. 16, 1993, are hereby incorporated by reference.

EXAMPLES

Example 1

16.23 g of butyl acetate, 25.97 g of xylene, 8.11 g of Solvesso 150, 8.11 g of Shellsol A, 18.99 g of cyclohexanone and 2.42 g of diacetone alcohol are placed in a glass flask and homogenized with stirring. Then 12.17 g of Plexigum M 335 binder (manufacturer: Röhm, Darmstadt) are slowly added and the mixture is further stirred for from 4 to 5 hours until the binder has dissolved. Subsequently, 8 g of Minatec® 31 CM pigment are added slowly with stirring and the mixture is homogenized. 100 g of coating material are obtained.

This coating material was applied using a pneumatic spray gun to flexible PVC and dried in air. The resulting surface resistance was in the region of 0.13 Mohm over the entire area. The layer is transparent.

Example 2

Rolling doors of flexible PVC in an explosion-protected area were coated with the coating formulation of Example 1 according to the invention. The surface resistance of $10^6$ ohm was well below the maximum surface resistance value required by the TÜH (technical monitoring authorities), of $10^9$ ohm. Regular examination showed that no changes occurred in the conductivity of the coating over a period of 6 months. Additionally, no changes were found with respect to abrasion resistance, flexibility and transparency. Consequently, the coating formulation according to the invention is outstandingly suitable for antistatic coatings in explosion-protected areas.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A conductive coating formulation comprising:
   (i) from 5–25% by weight of a binder comprising a mixture of
      a) from 40 to 60% by weight of an acrylic resin, and
      b) from 60 to 40% by weight of modified PVC,
   (ii) from 60–85% by weight of a solvent mixture comprising ester, aromatic and ketone solvents in a ratio of from 0.9:2.5:1.2 to 1.1:2.7:1.4, and
   (iii) from 5–25% by weight of an electrically conducting pigment.

2. The coating formulation of claim 1, wherein the acrylic resin is a resin based on methyl methacrylate.

3. The coating formulation of claim 1, wherein the modified PVC in the binder is PVC modified with vinyl acetate.

4. The coating formulation of claim 1, wherein in the solvent mixture the ester solvent is n-butyl acetate, the aromatic solvent is xylene, or a mixture of xylene with other aromatic hydrocarbons, and the ketone solvent is diisobutyl ketone, diacetone alcohol, cyclohexanone or mixtures thereof.

5. The coating formulation of claim 1, wherein the solvent mixture contains n-butyl acetate.

6. The coating formulation of claim 1, wherein the pigment is a mica coated with antimony-doped tin oxide.

7. The coating formulation of claim 1, wherein the electrically conductive pigment is not carbon black or another dark-colored pigment.

8. The coating formulation of claim 1, wherein the binder formulation comprises 10 to 15% by weight of the binder.

9. The coating formulation of claim 1, wherein the pigment is antimony-doped tin oxide.

10. The coating formulation of claim 1, wherein the pigment is contained on a support.

11. The coating formulation of claim 10, wherein the support is mica, kaolin, talc or glass platelets.

12. The coating formulation of claim 1, wherein the pigment contains antimony-doped tin oxide, halogen-doped tin oxide, aluminum-doped zinc oxide or halogen-doped zinc oxide.

13. The coating formulation of claim 1, wherein the pigment comprises a support material upon which is coated one or more metal oxide layers, the top layer being a conductive layer.

14. The coating formulation of claim 13, wherein the pigment comprises a mica support coated with a layer of titanium dioxide, which is coated with an intermediate layer of silicon dioxide, which is coated with a top layer of tin dioxide doped with antimony.

15. The coating formulation of claim 1, which is prepared by:
   mixing and homogenizing the solvents together,
   adding the binder to the solvent mixture and dissolving it therein, and
   adding the pigment to the binder solution and homogenizing it.

16. The coating formulation of claim 15, wherein, before adding the pigment to the binder solution, the pigment is converted into a paste or slurry by mixture with a part of the solvent mixture.

* * * * *